United States Patent [19]
Franzmann et al.

[11] Patent Number: 5,388,888
[45] Date of Patent: Feb. 14, 1995

[54] CUSHION CARRIER FOR CAR SEATS

[75] Inventors: Gunter Franzmann, Rockenhausen; Heiko Utsch, Hargesheim; Harald Wolsiefer, Krickenbach; Hans Schneider, Rathskirchen; Karl-Peter Armbrust, Saarbrucken, all of Germany

[73] Assignee: Keiper Pecaro GmbH & Co., Germany

[21] Appl. No.: 196,367

[22] Filed: Feb. 15, 1994

[30] Foreign Application Priority Data

Feb. 16, 1993 [DE] Germany .................. 4304597

[51] Int. Cl.6 ............................................ B60N 2/02
[52] U.S. Cl. ....................................... 297/284.11
[58] Field of Search ............... 297/284.7, 284.8, 284.9, 297/284.11, 344.15

[56] References Cited
U.S. PATENT DOCUMENTS 3,550,953  12/1970  Neale ................... 297/284.11 X
4,334,709   6/1982  Akiyama et al. ........... 297/284.11
4,583,781   4/1986  Hatsutta et al. .......... 297/284.11

FOREIGN PATENT DOCUMENTS 26668      4/1981  European Pat. Off. ....... 297/284.8
61394      9/1982  European Pat. Off. ....... 297/284.11
39927      4/1981  Japan .................... 297/284.11
375186533 11/1982  Japan .................... 297/344.15

Primary Examiner—Peter R. Brown
Attorney, Agent, or Firm—Wigman, Cohen, Leitner & Myers

[57] ABSTRACT

A carrier for the partial seat cushion of a car seat, in particular a motor vehicle seat is disclosed. The carrier includes two side members which extend in the longitudinal direction of the seat and to which is hinged a longitudinal member of a leg support bearing the front portion of the partial seat cushion so as to pivot around an axis, extending in the transverse direction of the seat, and to be fixed into selectable swivel positions. A spring-loaded swiveling device is assigned to the leg support wherein said swiveling device exerts on the leg support a swivel force, which is smallest in the lowest swivel position and increases until the highest swivel position has been reached.

6 Claims, 4 Drawing Sheets

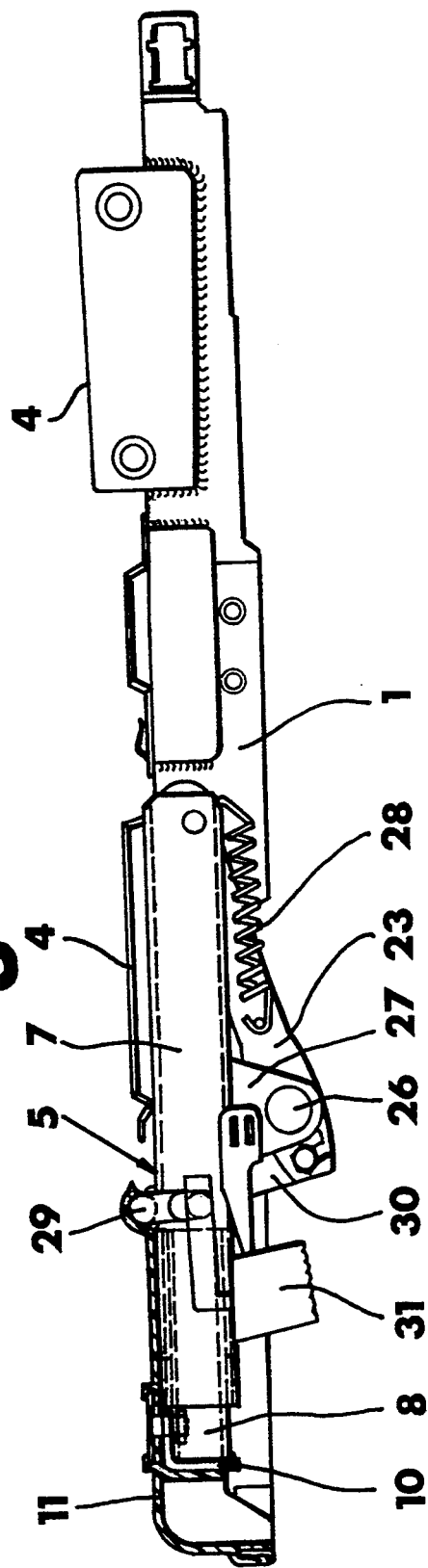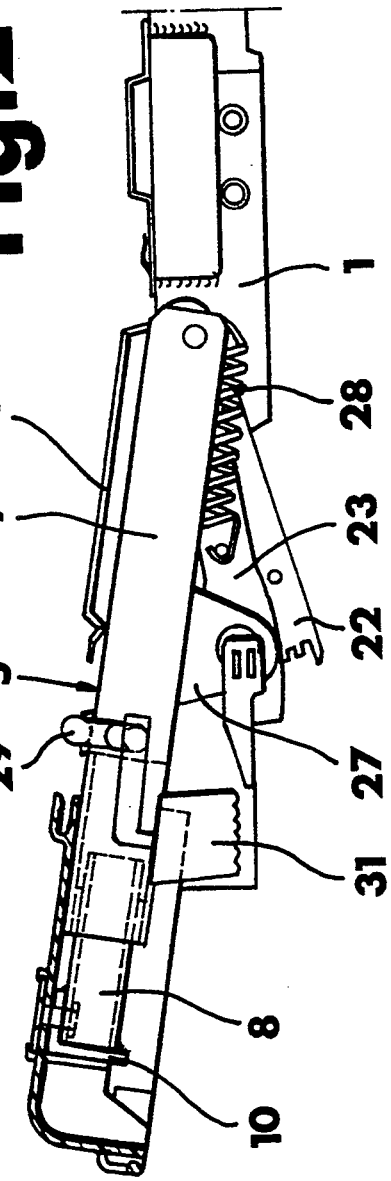

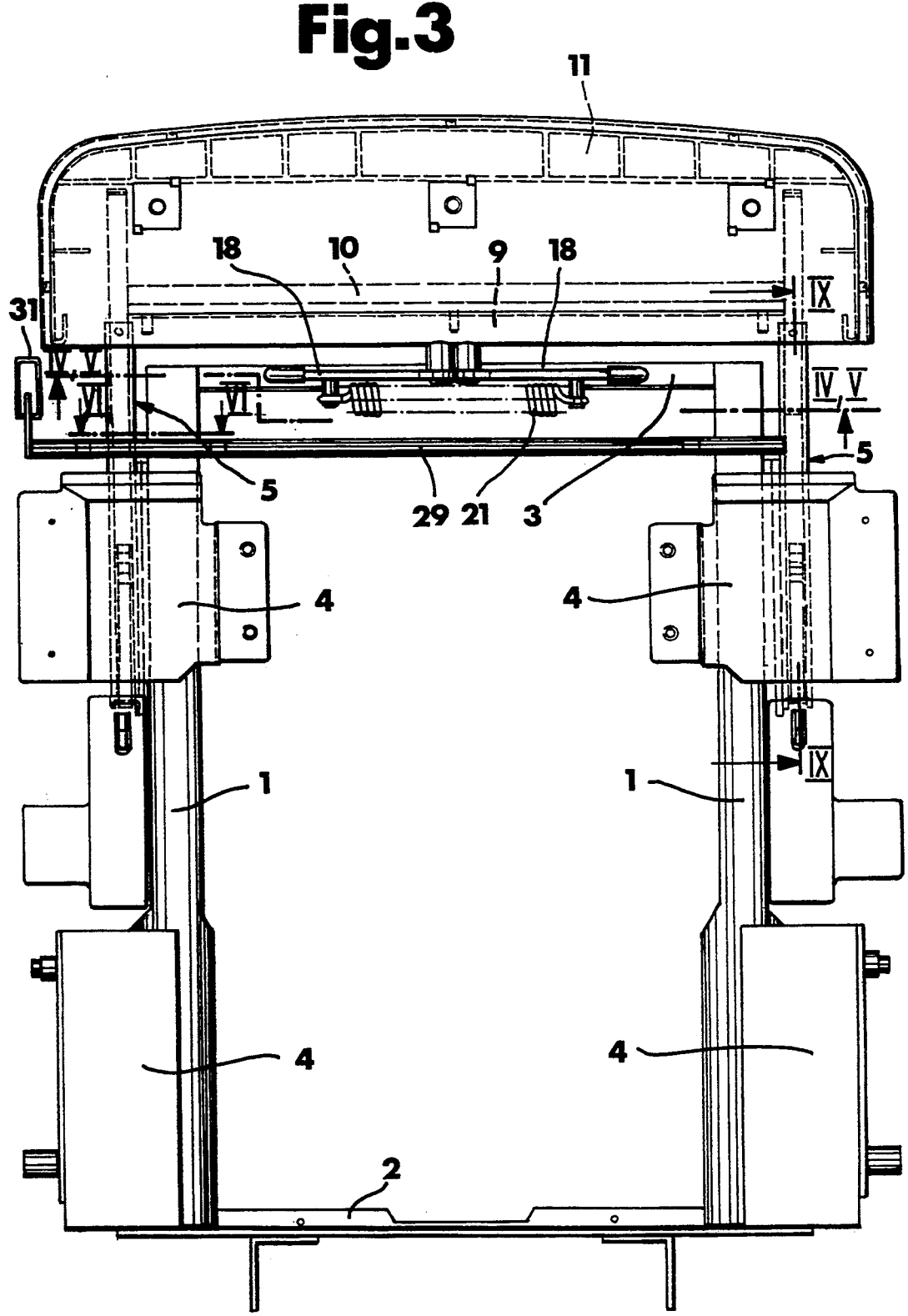

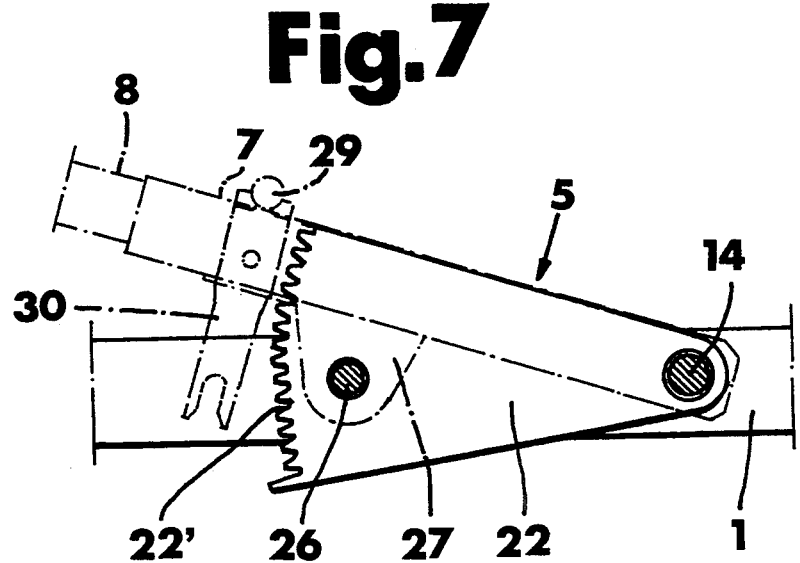
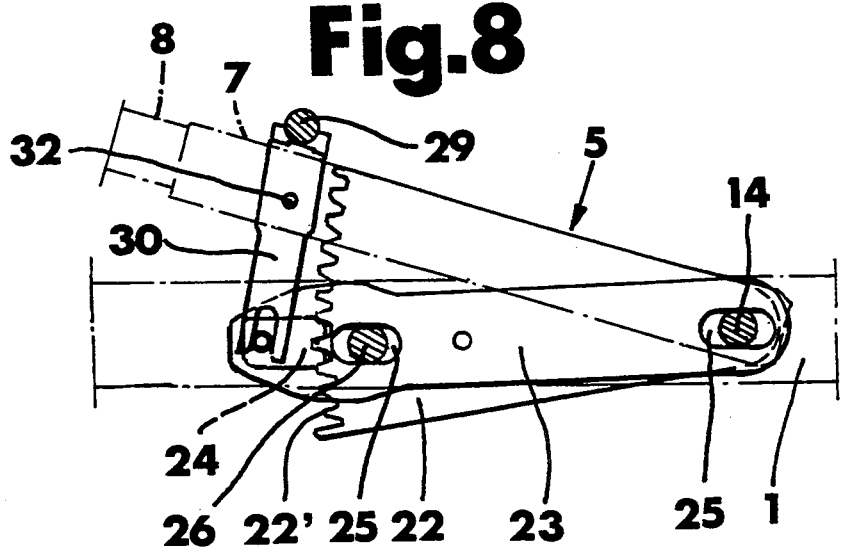
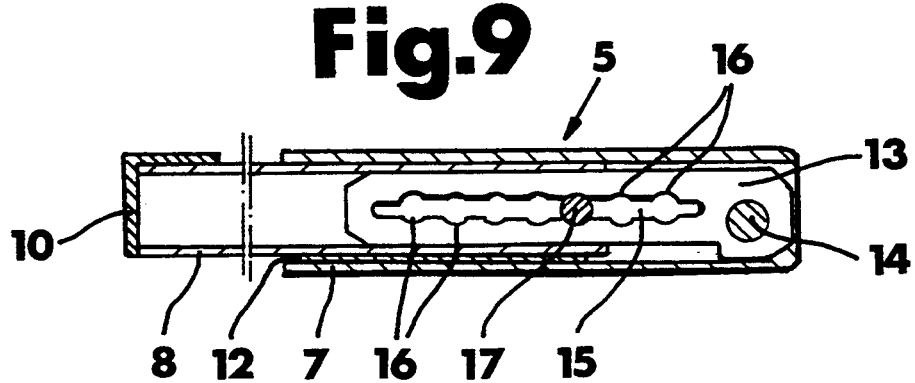

CUSHION CARRIER FOR CAR SEATS

BACKGROUND OF THE INVENTION

The invention relates generally to a carrier for the partial seat cushion of a car seat. In particular the invention relates to a motor vehicle seat, comprising two side members, which extend in the longitudinal direction of the seat and to which is hinged a longitudinal member of a leg support bearing the front portion of the partial seat cushion so as to pivot around an axis, extending in the transverse direction of the seat, and to be fixed into selectable swivel positions.

For known carriers of the aforementioned type the cost is relatively high, the adjustment of the leg support is cumbersome, or both.

OBJECTS AND SUMMARY OF THE INVENTION

Accordingly, the object of the present invention is to provide a carrier for the partial seat cushion of a car seat, which permits the leg support to be adjusted without any problems and yet is not expensive. Other objects and advantages of the present invention will become apparent from the description which follows.

Since the swivel force, which the spring-loaded swiveling device exerts on the leg support is the smallest in the lowest swivel position and increases until the highest swivel position is reached, the increase in cushion compression can be largely compensated so that the effective swivel force remains essentially constant over the entire range of adjustment of the leg support. Thus, the pressure that the seat user must exert to push downward after unlocking the leg support, also remains essentially constant over the entire swivel range. The swivel force of the swiveling device that is to be overcome thus can be selected in such a manner that the load required to swivel the leg support is relatively low. Since it is only necessary to partially relieve the cushion section carried by the leg support in order to move the leg support up, the leg support can be adjusted correctly while the seat is being used.

In a preferred embodiment the swiveling device includes at least one rocking arm, which is hinged with the axis of rotation, extending parallel to the longitudinal reach of the longitudinal members, to a cross member of the leg support that is connected to the two longitudinal members. The free end of the rocking arm is moveably braced in the longitudinal direction on a track connecting the two side members. The arm engages at one prestressed spring which has its greatest tension when the rocking arm stretches in the longitudinal direction of the cross member. The cost of such a swiveling device is quite low, because a simple helical tension spring can be used. As a consequence, the swivel force which is exerted on the leg support increases as the distance of the leg support from the lowest swivel position increases, despite the resulting decreasing spring tension.

Preferably, the swiveling device comprises two identical rocking arms in mirror-inverted arrangement, with which the prestressed spring engages at a distance from the axis of rotation.

To prevent the leg support from twisting, it is desirable to utilize a locking device for each of the two longitudinal members. The locking devices are identical and operated by means of a joint actuator. Each of the locking devices can include, for example, a locking plate, which is rigidly connected to the assigned side member and has an edge facing away from the axis of rotation to form a toothed rim. The rim lies on an arc about the axis of rotation and meshes with teeth provided in the locking element to a locking position. The locking element is preferably spring-loaded and mounted on the longitudinal member so as to move the member longitudinally.

To achieve optimal leg support, in a preferred embodiment the two longitudinal members of the leg support can be telescoped. They can be made, for example, of one outer guide tube each and one inner tube, which can be moved longitudinally. The tubes may be formed having a rectangular or square cross section, although other shapes can be utilized. In a preferred embodiment a stop rod, with which the stop element connected to the inner tube interacts force-lockingly, is connected to the outer guide tube. This stop rod is provided with an oblong slot, which extends in the longitudinal direction of the rocking arm and which includes aligned stops on both sides, which interact with a stop element of the inner tube. The stop element can be a pin which penetrates the oblong slot. The stop rod is preferably made of plastic. The stop force is equally high in all stop positions and the width of the oblong slot decreases starting from the ends in the direction of the center.

BRIEF DESCRIPTION OF THE DRAWINGS

In the following the invention is explained in detail with the aid of one embodiment shown in the drawings, wherein:

FIG. 1 is a side view of a preferred embodiment in a position of the leg support in the lowest swivel position;

FIG. 2 is a fragmented side view of the embodiment of FIG. 1 in a position of the leg support between the lowest and the highest swivel position;

FIG. 3 is a top view of a preferred embodiment;

FIG. 7 is a sectional view taken along the line VII—VII of FIG. 6;

FIG. 8 is a sectional view taken along the line VIII—VIII of FIG. 6; and

FIG. 9 is a fragmented sectional view taken along the line IX—IX of FIG. 3.

DETAILED DESCRIPTION OF A PREFERRED EMBODIMENT

Figure 6:
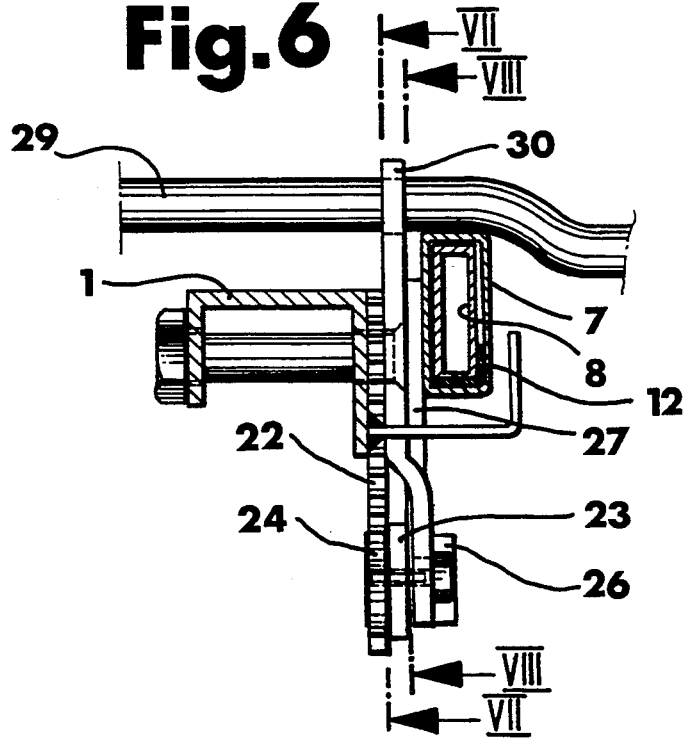
FIG. 6 is a sectional view taken along the line VI—VI of FIG. 3.

Referring now to the drawings wherein like numerals refer to like elements throughout the several views, a carrier for the partial seat cushion of a motor vehicle seat exhibits, is shown in particular in FIG. 3. Two parallel side members 1 are formed by one U section track each that is open at the bottom (FIG. 6). A posterior traverse or cross member 2 connects the two side members 1 at its bottom. An anterior traverse or cross member 3 connects the two side members 1 at its upper end. The two cross members 2, 3, form a rectangular frame with side members 1 to which carrier plates 4 are attached in the region of the two side members 1.

A leg support with an axis of rotation extending in the transverse direction of the seat is hinged to the two side members 1 at a distance from the front end of the two side members 1. This leg support includes two identical longitudinal members 5, which, as shown in FIG. 3, are arranged on the outside next to the one on the other side member 1 and extend parallel to each other and to the side members 1.

Each of the two longitudinal members 5 comprises an outer guide tube 7, whose cross section is rectangular, and an inner tube 8, which is also rectangular and can be moved longitudinally in said outer guide tube. The front end of both guide tubes 7 is connected by means of a cross tube 9, which runs parallel to the anterior traverse 3, whereas the front end of each inner tube 8 is connected rigidly to an angular track 10, which runs parallel to the cross tube 9. In the preferred embodiment a reinforced plate 11, forming the anterior end section of the leg support, is made preferably of plastic, and is attached to angular track 10.

To enable the inner tubes 8 to move without play yet with ease in the guide tubes 7, a plastic track or guide 12 having an angular section is positioned between inner tube 7 and outer tube 8. One leg of guide 12 is below the underside of the inner tube 8 and the other leg lies next to the outside of inner tube 8, as shown in FIG. 6.

A stop device which holds the inner tube 8 in the selected retraction position compresses a plastic stop rod 13, whose profile, and whose cross section is rectangular, is selected in such a manner that the inner tube 8 can be readily moved by way of the stop rod 13. As shown in FIG. 9, the axis of rotation 14 of the leg support penetrates the rear end of the stop rod 13, which is provided with an oblong slot 15, whose two peripheries have aligned stop depressions 16. The oblong slot 15 is penetrated by a cross pin 17, whose two ends are attached to the side walls of the inner tube 8. To obtain a constant stop force over the entire displacement path, even though the flexural strength of both legs defining the oblong slot 15 decreases toward the middle, the oblong slot 15 has a width that decreases from its two ends to the middle.

Figure 4:
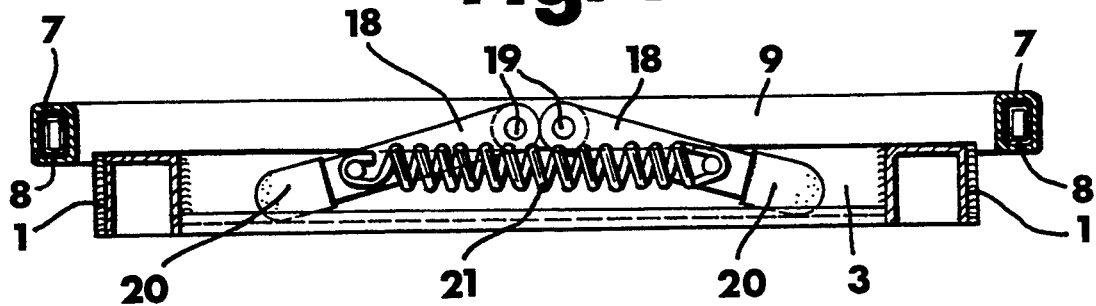
FIG. 4 is a sectional view taken along the line IV—IV of FIG. 3 a position of the leg support above the lowest swivel position.
Figure 5:
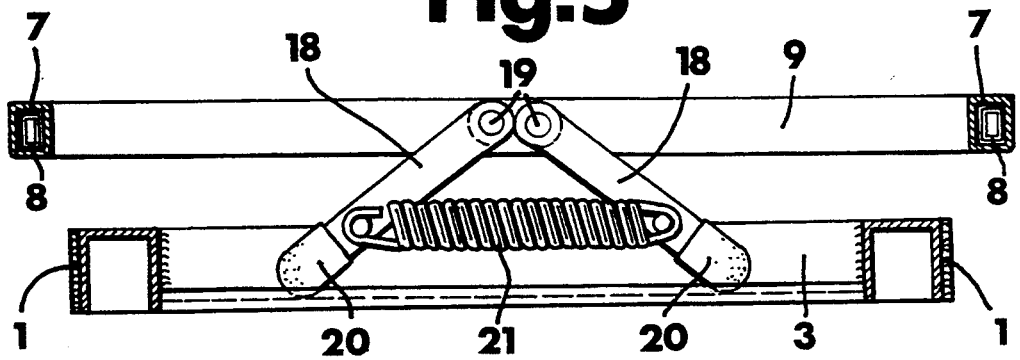
FIG. 5 is a sectional view taken along line V—V of FIG. 3 at a higher position of the leg support.

A spring-loaded swiveling device, which acts to swing the leg support to the top, engages with the transverse tube 9 connecting the front end of the two longitudinal members 5. This swiveling device includes two identical rocking arms 18, which are arranged mirror inversely and which are hinged side-by-side with the axis of rotation 19, extending in the longitudinal direction of the seat, to the transverse tube 9 and extends from here to the outside and toward the bottom. Arms 18 have a free end which bear a plastic cap 20 exhibiting good sliding properties. Caps 20 are supported as shown in FIGS. 4 and 5, on a sliding surface formed by the front cross members 3. The one or the other end of a prestressed helical tension spring 21 is attached to the two rocking arms 18 at a distance from the axis of rotation 19.

The force of the prestressed helical tension spring 21 acts to swing the two rocking arms 18 towards each other, whereby said rocking arms exert on the transverse tube 9 a force in the sense of swinging the leg support upwardly. As a consequence of changing the angle, which encloses the rocking arms 18 with the tranverse tube 9, when the leg support is moved to the top out of its lowest swivel position, the swivel force exerted on the leg support increases approximately in proportion to the increase in the compression of the cushion, despite the fact that the force of the helical tension spring 21 decreases at the same time. Therefore, the resulting force, which must be overcome when the leg support is adjusted toward the bottom, is approximately the same in all swivel positions. This force is selected in such a manner that it can be readily generated by the seat user, while using the seat. On the other hand, the seat user has to relieve the load on the leg support only a little in order to achieve a swivel motion toward the top.

To be able to lock the leg support in the selected swivel position, a locking device is assigned to both longitudinal members 5.

Each of the two identical locking devices includes a toothed plate 22, which has the shape of a circular segment and which rests on the outside of the assigned side member 1 and is connected rigidly to said side member. The circular rim points toward the front and forms a toothed rim 22'. The end, which points toward the rear, is penetrated by the axis of rotation 14. A track-shaped guide plate 23, whose front end section projects toward the front beyond the toothed plate 22, is arranged next to the outside of the toothed plate 22. A pawl 24, which is aligned on the toothed rim 22' and is provided with correspondingly designed teeth along the rim pointing in the direction of this toothed rim 22', is attached to the inside of this front end section that faces the side member 1.

As shown in FIG. 8, the rear end section and near the front end section of the guide plate 23 is provided with a guide slot 25 extending in the longitudinal direction. The rear guide slot 25 is penetrated by the axis of rotation 14; the front guide slot 25, by a guide bolt 26 that runs parallel to the axis of rotation 14 and that is carried by a bearing plate 27, which projects downwardly from the longitudinal member 5 and reaches from the outside over the guide plate 23, as shown in FIG. 6. One end of a prestressed helical tension spring 28 is suspended from the rear end of the guide tube 7. The other end engages with guide plate 23, to hold pawl 24 in engagement with toothed rim 22'.

At both locking devices, pawl 24 moves simultaneously against the force of the prestressed spring 28 into the release position. A cross rod 29 is provided that is moved at a short distance in the transverse direction of the seat over the two longitudinal members 5. One end of cross rod 29 projects sideways over the one longitudinal member 5. An actuating lever 30 is mounted on the inside of each longitudinal member 5 so as to swivel with respect to axis 32 which extends in the transverse direction of the seat (see FIG. 8). As shown in FIG. 6, the upper end of actuating lever 30 is connected rigidly to the cross rod 29. The bottom end forms as seen in FIGS. 7 and 8, a fork, which accommodates a cone provided on the front end section of the guide plate 23. Therefore, while swinging clockwise at the viewing angle according to FIG. 8, the guide plate 23 and the pawl 24 are moved into the release position in which the locking device is released.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Carrier for a seat cushion of a vehicle seat, said seat cushion having a front and said vehicle seat having a longitudinal direction and a transverse direction, comprising:

two side members, which extend in the longitudinal direction of said seat and to which are hinged two longitudinal members of a leg support which supports the front portion of the seat cushion so as to pivot around an axis extending in the transverse direction of said seat, fixing means for fixing said leg support in selectable swivel positions, a swiveling device operatively connected to the leg support for moving it upwardly and exerting on said leg support a swivel force, said swiveling device including at least one rocking arm having two ends, one end of which is connected pivotably to a cross member of said leg support, which is connected to said longitudinal members, and the other end, which is free, being supported slidably on a track connecting said side members, said swiveling device further including a prestressed spring exerting a rocking force on said at least one rocking arm, the spring tension of said spring being greatest when the rocking arm extends in the direction of said cross member, whereby the swivel force of said swiveling device is smallest in the lowest swivel position and increases until the highest swivel position has been reached.

2. Carrier, as claimed in claim 1, wherein said longitudinal members are telescoped and include an outer guide tube and an inner tube, which can be moved in the longitudinal direction; said tubes having a rectangular or square cross section; a stop rod comprising a stop element connected to the inner tube which interacts to lock said outer guide tube.

3. Carrier, as claimed in claim 2, wherein said stop rod includes an oblong slot which extends in the longitudinal direction of said longitudinal member; aligned stop depressions provided in two peripheries of said oblong slot, said stop element being formed by a pin which penetrates said oblong slot.

4. Carrier, as claimed in claim 3, wherein said stop rod is made of plastic and the width of said oblong slot decreases starting from the two ends in the direction of the middle.

5. Carrier, as claimed in claim 1, including two identical rocking arms hinged and connected to the cross member and a prestressed spring which engages both rocking arms and extends in a direction parallel to the longitudinal direction of the cross member.

6. Carrier, as claimed in claim 1, further including a locking device for each of said longitudinal members, said locking devices being identical and including a joint actuating lever.

* * * * *